United States Patent Office 3,068,124
Patented Dec. 11, 1962

3,068,124
STARCH SIZE
Eugene F. Paschall, Orland Park, and Walter J. Katzbeck, Oak Park, Ill., and William Hach, Burton, Wash., assignors to Corn Products Company, New York, N.Y., a corporation of Delaware
No Drawing. Filed Dec. 30, 1959, Ser. No. 862,773
1 Claim. (Cl. 117—139.5)

This invention relates to an improved laundry starch composition. More specifically this invention relates to and has as its main object the provision of a method for sizing cellulose fabrics using a laundry starch comprising a thin-boiling starch imino dimethylcarbamate, in granule form, which is highly substantive toward cotton fabrics, which gives excellent sizing under ironing and is removable in the subsequent wash.

Most starches now used for laundry sizing are applied to the garments in the gelatinized (cooked) form. In some instances, cooking is done by the user; and in others, the starches are precooked by the manufacturer and marketed either in liquid or dry form. It is relatively expensive to use starches in gelatinized form for laundry sizing since only a small fraction of the starch paste is retained by the garment. Moreover, in order to obtain a high degree of fabric stiffening, it is necessary to deposit on the fabric a relatively large amount of the starch paste. A much greater stiffening effect per unit weight of starch can be achieved by gelatinizing starch granules in situ on the garment by the heat of the iron. Unfortunately, all starches in granule form, except rice starch, mask and flake extensively on the fabric during ironing. Rice starch apparently gives good sizing characteristics because the granules are small enough to penetrate the interstices of the fabric. Upon ironing, rice starch is gelatinized to a large extent within the fabric structure rather than on the surface. Furthermore, all the starches in granule form, including rice starch, are poorly substantive to cotton fabric so that deposition is achieved primarily by filtering the starch onto the fabric. The starch granules are unevenly deposited, with high starch concentrations deposited in the folds and seams of the garment. This uneven distribution is to a large extent responsible for the excessive masking and flaking observed.

It is known that the substantivity of starch in granule form to cellulosic materials, such as paper and cotton, is greatly enhanced by substituting cationically charged groups on the starch granules. U.S. Patents 2,813,093 and 2,876,217 describe methods for making cationic starch derivatives containing tertiary amino and quaternary ammonium groups, respectively, in granule form. These starch derivatives in granule form are highly substantive to cotton fabrics. However, although they are satisfactory as far as pick-up and even distribution are concerned, they do become rigidly attached to the fabric, making the fabric cationically active. When the sized fabrics are washed, negatively charged soil particles are redeposited on the fabrics leaving them, in some instances, even more soiled than they were before washing. Another less serious objection is that some masking and flaking on the fabric occurs during ironing.

In copending application, Serial No. 621,990, now U.S. Patent No. 2,894,944, methods for the production of "imino starches" are described. These starches in granule form are also cationically active by virtue of the presence of imino nitrogen. Briefly, the process of preparation involves the reaction of disubstituted cyanamides with starch in the presence of a strongly basic catalyst as illustrated by the following equation:

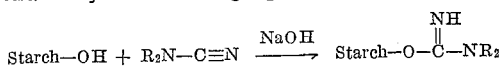

These derivatives possess one unique and extremely valuable feature not found in the previously mentioned cationic starches. The imino group is hydrolyzed under the heat of the iron so that the sized fabric does not retain a cationic charge. As a result, soil is neither picked up from the air nor redeposited on the fabrics during subsequent wearing and launderings.

In copending application, Serial No. 765,937, now U.S. Patent No. 2,965,518, the use of a variety of starch imino disubstituted carbamates in granule form as a laundry starch is described. Although these starches satisfied the basic requirement of not leaving the garment cationically active after ironing, all possessed one serious deficiency—fabrics sized with the imino starches masked excessively on the fabric during ironing even at low starch concentrations. Masking appeared to be much greater on fabrics sized with the above imino starch than with quaternary ammonium and tertiary amino starches. This behavior was not entirely unexpected since it had been observed that the imino starches would not gelatinize completely when cooked in water, perhaps because of cross-linking through the double bond of the imino nitrogen or because of hydrogen bonding involving imino hydrogen atoms. In any event, it appeared that, after ironing, partially gelatinized starch was deposited mainly on the surface of the fabric with very little penetration into the interstices of the fabric. Furthermore, the products of the above disclosure, relatively speaking, were not highly substantive.

This invention is based on our surprising discovery that, if imino starch in granule form is prepared from thin-boiling starch and then dehydrated with an organic solvent, the product not only possesses excellent sizing characteristics in all respects but, in addition, has a greatly increased substantivity to cotton fabrics. Imino starch prepared in the above manner is at least twice as substantive as the untreated imino starch, that is, imino starch not dehydrated and prepared from unmodified corn starch, and has 10 to 20 times more sizing potential (stiffening power) than commercial laundry starches.

By thin-boiling starch we mean starch in granule form which has been hydrolyzed by acid, enzyme or hypochlorite to the 30 to 70 fluidity level. Fluidity is calculated from Scott viscosity data using the expression $$\text{Fluidity} = \frac{2000}{\text{Scott test value}}$$

where 28.35 g. of starch is cooked in 280 ml. of water. See Kerr, Chemistry and Industry of Starch, 2nd edition, pages 133–134. Methods for performing such hydrolyses are well known in the art. The hydrolysis should be carried out under conditions so that the starch granules remain in substantially an unswollen condition. Dehydration of the imino starch may be effected with organic solvents such as, for example, methanol, ethanol, acetone and mixtures thereof.

Our invention is particularly applicable to dehydrated imino starch in granule form prepared from dimethylcyanamide and thin-boiling starch. The imino starch product is designated as starch imino dimethylcarbamate.

It is not known with certainty why starch imino dimethylcarbamate prepared from thin-boiling starch and then dehydrated with an organic solvent shows such a surprising improvement in substantivity and sizing performance over prior art products. A possible explanation for the superior sizing performance is that, by partially hydrolyzing the parent starch, the starch granule structure is weakened; and as a result, a more complete gelatinization of the imino starch occurs when the sized fabric is ironed. It is possible that when this unique starch imino dimethylcarbamate is dehydrated, such dehydration shrinks the granules of the partially hydrolyzed imino starch so that a greater number of granules can be deposited on and within a unit area of cloth. This would account for the exceptionally high substantivity observed. Furthermore, shrinkage of the starch granules due to dehydration would result in a greater penetration of the starch granules into the interstices of the fabric structure. Thus, a certain amount of internal sizing may occur as is probably achieved with the small granule rice starch.

The above explanation, however, is only speculative and we wish not to be bound by any particular theory or explanation.

The invention will be further illustrated by the following examples which are intended as typical and informative only, and in no way limiting the invention. Although we have described our invention with respect to dimethylcyanamide as an example of disubstituted cyanamides, we do not intend to be limited thereby.

Before the examples are set forth, a description will be first given for measuring the substantivity of cationic starch for cotton cloth, namely:

Swatches of cloth, 4⅜ x 17¾ inches were cut from washed, Indian Head cotton cloth. The swatches were vacuum-dried for 3 hours at 120°–125° C., cooled and weighed. A suspension of 2.00 or 5.00 grams of cationic starch (ground to pass 100 or 200-mesh screen) in 1 liter of water was prepared. One weighed swatch was agitated in the starch suspension for 5 minutes. Then, the sized cloth was quickly removed, squeezed lightly by hand and run through a wringer. The swatch was then placed in a stretcher frame and allowed to dry for about one-half hour. Then the damp cloth was ironed with a hand iron set for cotton. The swatch was then vacuum-dried overnight at 100°–110° C. and reweighed. The percentage gain in cloth weight is then calculated. This value is a relative measure of the substantivity.

*Example I*

This example illustrates the preparation of a 12-mole batch of 0.026 D.S. imino starch from 40-fluidity acid modified corn starch and dimethylcyanamide.

Twelve moles of 40-fluidity acid modified corn starch (in granule form) (2160 grams at 12 percent moisture) were slurried in 2.76 liters of water containing 3.36 moles (480 grams) of anhydrous sodium sulfate and 1.2 moles (48 grams) of sodium hydroxide. The slurry was cooled to 22° C. and 1.2 moles (96 ml.) of dimethylcyanamide added. The slurry was agitated 20 hours at 22° C. and neutralized to pH 7 with HCl. A portion of the slurry was filtered and the filter cake thoroughly washed with water and dried. The imino starch was in original, granule form. Based on Kjeldahl nitrogen analysis, the product was 0.026 D.S.

*Example II*

This example illustrates the increase in substantivity when the starch imino dimethylcarbamate of Example I, prepared from 40-fluidity acid modified corn starch, is dehydrated with methanol.

The slurry from Example I was divided into four parts—A, B, C and D. A was filtered and air-dried without additional treatment. B was filtered and the filter cake washed with 500 ml. of water per mole of product. C was filtered and the filter cake washed first with 500 ml. of water to eliminate salts followed with 500 ml. of anhydrous methanol. D was filtered and washed with 1000 ml. of methanol. The filter cakes were then air-dried. The data tabulated below show that the substantivity of the 0.026 D.S. imino starch is almost doubled by dehydrating the filter cake with methanol. The same increase in substantivity is observed if the filter cake is first washed with water before dehydration with a water miscible organic solvent. In the examples below, 5 grams of imino starch per liter of water was employed.

| Treatment of filter cake | Substantivity, percent,[1] 5 grams imino starch per liter H₂O |
|---|---|
| A. None | 3.6 |
| B. Water washed only | 2.5 |
| C. Water washed then dehydrated with methanol | 6.2 |
| D. Dehydrated with methanol without intermediate water washing | 6.0 |

[1] Percent increase in fabric weight.

*Example III*

This example illustrates the increase in substantivity of starch imino dimethylcarbamate prepared from acid modified corn starch in granule form over starch imino dimethylcarbamate prepared from untreated corn starch. All of the products were prepared at the 0.03 D.S. level by the procedure of Example I. One portion of each product was washed with water and another portion washed with water then dehydrated with methanol by the procedure of Example II. Substantivity values (percent increase in fabric weight) were then determined using both 5 grams and 2 grams of starch imino dimethylcarbamate per liter of water. The following significant conclusions may be drawn from the data tabulated below. The substantivity of the imino starch prepared from unmodified (thick-boiling) corn starch is not increased significantly by methanol dehydration. On the other hand, substantivity is greatly increased when starch imino dimethylcarbamate is prepared from starch in granule form, acid modified to the 20 to 60-fluidity levels. Thus, both hydrolysis of the parent starch and dehydration of the product is necessary to obtain the highest substantivity.

| Experiment | Starch fluidity | Percent substantivity of imino starch after— | | | |
|---|---|---|---|---|---|
| | | Water washing | | Methanol dehydration | |
| | | 5 g./l. | 2 g./l. | 5 g./l. | 2 g./l. |
| 17A | Thick-boiling | 1.98 | 1.62 | 2.57 | 1.17 |
| 16A | 20 | 3.70 | 1.99 | 5.09 | 2.48 |
| 33A | 40 | 3.10 | 2.33 | 5.20 | 3.59 |
| 12C | 60 | 3.82 | 2.15 | 6.10 | 3.93 |

*Example IV*

In this example the substantivity of starch imino dimethylcarbamate is compared with the substantivity of quaternary ammonium and tertiary amino starch derivatives. All of these cationic derivatives were prepared at about 0.03 D.S. from both thick- and thin-boiling starch and then washed with water or dehydrated with methanol as described in Example II. Substantivity values were determined using 2 grams of cationic starch per liter of water. The data below clearly show that, whereas the substantivity of imino starch prepared from thin-boiling starch and then dehydrated is greatly enhanced, the substantivity of granual quaternary ammonium and tertiary amino starch is not substantially improved. In fact, the substantivity of the tertiary amino starch, dehydrated with methanol, actually decreases as the parent starch fluidity is increased.

| Starch fluidity | Treatment | Substantivity of various cationic starches | | |
|---|---|---|---|---|
| | | Quaternary ammonium a | Tertiary amino b | Imino dimethylcarbamate |
| Thick-boiling | Water-washed | 1.95 | 2.71 | 1.62 |
| 20 | ----do---- | 2.09 | 1.60 | 1.99 |
| 40 | ----do---- | 1.64 | 1.16 | 2.33 |
| 60 | ----do---- | 1.65 | 0.96 | 2.15 |
| Thick-boiling | Methanol dehydrated | 1.99 | 2.78 | 1.17 |
| 20 | ----do---- | 1.90 | 2.27 | 2.48 |
| 40 | ----do---- | 2.03 | 2.62 | 3.50 |
| 60 | ----do---- | 2.59 | 2.12 | 3.93 | a Prepared from 2,3-epoxypropyltrimethylammonium chloride.
b Prepared from 2-chloroethyltriethylamine.

*Example V*

This example compares substantivities observed when 0.026 D.S. starch imino dimethylcarbamate is treated with different dehydrating agents. The derivative was prepared from 40-fluidity acid modified corn starch by the procedure of Example I. The derivative was washed with water to eliminate salts prior to dehydrating with the organic solvent according to the procedure of Example II. Substantivities were determined using 5 grams of starch per liter of water. The results below show that methanol, acetone and ethanol are all effective in greatly increasing the substantivity of the imino starch.

| Experiment | Dehydrating agent | Substantivity |
|---|---|---|
| A | Methanol | 7.27 |
| B | Acetone | 7.85 |
| C | Ethanol | 8.02 |
| D | Water (control) | 4.3 |

*Example VI*

This example compares the ironing characteristics observed with 0.023 D.S. 40-fluidity acid modified starch imino dimethylcarbamate on cotton fabric with those obtained using 0.026 D.S. thick-boiling starch imino dimethylcarbamate. The derivatives were prepared by the procedure of Example I.

Two grams each, of the above products, was dispersed in 1 liter of water at 80° F. One navy blue cotton percale swatch, measuring 11 x 18 inches, was immersed in each of the dispersions for 5 minutes with intermittent agitation. The swatches were removed and wrapped separately in dry towels for 1 minute to remove excess moisture. The swatches were then ironed dry with an electric hand iron, set at cotton temperature.

Both swatches ironed smoothly with no sticking to the iron observed. The extent of masking or graying on the coth was much more predominant on that cloth sized with the thick-boiling product. It was also noted that the stiffness of this swatch was much less than that of the cloth sized with the 40-fluidity product which gave the cloth a stiffness value arbitrarily rated as heavy.

Thus, by practical test, the results obtained substantiate those obtained in the previous examples, and show again that a thin-boiling derivatized product is much more substantive to cotton cloth than is a derivative made from thick-boiling starch.

The experiment using the 40-fluidity product was repeated except 1 and 0.5 gram of each product was dispersed in 1 liter of water. Swatches were sized in each of the dispersions and treated as above. The swatch sized with 1 gram per liter of the 40-fluidity product had greater stiffness than that prepared above from the 2 grams per liter thick-boiling product, and masking on cloth was substantially eliminated. The cloth sized in the dispersion containing 0.5 gram per liter of the 40-fluidity product, had a stiffness value equal to the cloth prepared from the 2 grams per liter thick-boiling product, with no evidence of masking on the cloth.

The results above show that the 40-fluidity derivative has about 4 times more stiffening power than the thick-boiling product. Modern convention demands that a starch product give a smooth, pliable, nongraying, light finish to cotton fabric. The 40-fluidity product answers this purpose admirably whereas the thick-boiling derivative does not.

*Example VII*

This example illustrates the influence of D.S. of imino starch on substantivity to cotton fabrics. Starch imino dimethylcarbamate was prepared from 40-fluidity acid modified corn starch at D.S. levels ranging from 0.01 to 0.055. Reaction conditions were the same as described in Example I except that different concentrations of dimethylcyanamide were used. Each product was washed with one liter of methanol per mole of product. Substantivity to cotton fabric was determined using 5 grams of imino starch per liter of water. The data tabulated below correlate D.S. with substantivity (percent increase in fabric weight). It is evident from the data that substantivity is greatly increased over the control at D.S. levels as low as 0.01 D.S.

| Imino starch, D.S. | Substantivity (percent increase in fabric wt.) |
|---|---|
| 0.055 | 4.9 |
| 0.04 | 5.5 |
| 0.03 | 6.0 |
| 0.02 | 5.1 |
| 0.01 | 4.4 |
| 0.00 (40-Fluidity starch control) | 0.6-1.0 |

We claim:

In a process for starching cellulose fabrics, involving the contacting of the fabric with a slurry of a starch imino dimethylcarbamate, which has been prepared in aqueous medium from dimethylcyanamide and starch and dehydrated with a water miscible organic solvent, the improvement which comprises employing a starting thin boiling starch having a fluidity of about 30 to about 70.

References Cited in the file of this patent

UNITED STATES PATENTS

| 2,894,944 | Paschall | July 14, 1959 |
| 2,965,518 | Meisel | Dec. 20, 1960 |